3,088,158
CLEANING AND POLISHING SPONGE
Francis K. Boyle, Tonawanda, and John J. Duane, Buffalo, N.Y., assignors to Union Carbide Corporation, a corporation of New York
No Drawing. Filed Mar. 28, 1961, Ser. No. 98,759
14 Claims. (Cl. 15—506)

This invention relates to a chemical formulation which is suitable for simultaneously washing and waxing automotive finishes and the like. More particularly, the invention relates to polyurethane sponges which are impregnated with such formulations.

In order to apply a protective layer of wax to an automotive finish it is essential for the finish to be dirt-free at the time of application of the wax. Prior art methods call for separate cleaning and polishing operations. This is obviously a time consuming and tedious job.

The principal object of the invention is to provide a chemical formulation which is capable of simultaneously cleaning and waxing a surface such as an automotive finish.

A salient object of the invention is to provide a sponge impregnated with such a formulation which will elute the formulation upon wetting.

Broadly stated, the objects of the invention are accomplished by an oil-in-water emulsion which comprises a cationic emulsifier, a non-ionic emulsifier, emulsifiable wax, oil, and water, and which is impregnated in a flexible open-pore polyurethane foam sponge.

In the practice of the invention, the oil-in-water emulsion is injected into the polyurethane foam sponge at elevated temperatures where it is permitted to solidify. When the sponge is later wetted and brought into contact with the automotive finish, the emulsion leaches out of the sponge and cleans and waxes the finish simultaneously. Upon rinsing the surface with clean water, a polished finish is presented. A visible "break" of the water film is experienced during the rinse-off, which signifies the deposition of a durable, glossy, protective coating.

Materials which have been found suitable for use as the sponge material of the invention are flexible open pore polyurethane foams. Polyurethane foam is tough and its density and pore size is easily controlled, thus assuring convenience of handling, ease of impregnation with the cleaning and waxing formulation, and proper elution rate of the formulation by water upon use. Polyester and polyether urethane foams are particularly suited to the practice of the invention due to the fact that they evidence a mildly abrasive cleaning action. Natural and cellulosic sponges have been found to be unsatisfactory in the practice of the invention.

A specific example of a suitable sponge material is a polyester or polyether urethane foam having a density of about 2 pounds per cubic foot, a minimum tensile strength of about 20 pounds per square inch, a minimum ultimate elongation of about 200 percent, a maximum compression set of 10 percent (as measured by American Society of Testing Materials D1564–58T, method B), a load requirement for 50 percent compression of at least about 0.65 pound per square inch, a pore size of about 35 to 45 pores per square inch, no more than 10 percent loss in tensile strength after exposure to 5 pounds per square inch of steam for one hour, and an isocyanate index of from about 100 to 105.

If desired, a thin resinous coating may be applied to one side of the urethane foam sponge. A non-water soluble epoxy resin or other non-soluble resins such as alkyd, melamine and phenolic resins are examples of suitable resins. These resins form a lining for the pores of the sponge rather than blocking the pores. The resinous coating is mildly abrasive and permits the easy removal of bug residues and the like. The depth of penetration of the coating is adjusted to give the proper toughness to the sponge.

The cationic emulsifier in the formulation of the invention is substantive to the finish which is being treated. Suitable cationic emulsifiers include those commercially available under the trademarks "Armac C" and "Armac T" which are respectively a coconut oil quaternary amine acetate and an aliphatic amine acetate. These trademarks identify products of Armour and Company. A cationic emulsifier concentration of from about 5 to 8 weight percent of total formulation has been found most advantageous.

The non-ionic emulsifier serves to work the oils into the emulsifier and also furnishes in conjunction with the cationic emulsifier, both acting as surfactants, the major part of the cleaning action. Suitable non-ionic emulsifiers include those available under the following trademarks: "Tergitol NP–27" (nonyl phenyl polyethylene glycol ether, a product of Union Carbide Corporation); "Span 40" (sorbitan monopalmitate), "Tween 20" (polyoxyethylene sorbitan monolaurate); "Renex 678" (polyoxyethylene nonyl phenol), all products of Atlas Powder Company; and "Aerosol OT" (sodium dioctyl sulfosuccinate, a product of American Cyanamid Company). A non-ionic emulsifier concentration of from about 10 to 28 weight percent of the total formulation has been found most advantageous.

Anionic emulsifiers have been found to be unsuitable in the formulation of the invention.

The emulsifiable wax or blend of waxes which is included in the formulation must be a solid at room temperatures. The waxes provide a durable gloss, impart hardness to the formulation, and generally give the desired physical and leaching out properties to the formulation. Included among suitable waxes are the following which are commercially available in the trade under the names: Sun 985 Y wax; Sun 4415 wax; Sun 5512 wax; Durawax 1227 and BD–11. The various identifying properties of these particular waxes are set forth below. A wax concentration of from about 13 to 16 weight percent of the total formulation has been found most advantageous.

Sun 985 Y wax—a microcrystalline wax:
- Melting point, °F _____ 193
- Penetration at 77° F _____ 5
- Oil content, weight percent _____ .4
- Viscosity at 210° F., in Saybolt Universal Seconds _____ 85.1
- Specific gravity at 60° F _____ .943

Sun 4415 wax—a paraffin wax:
- Melting point, °F _____ 145
- Penetration at 77° F _____ 12
- Oil content, weight percent _____ .4
- Viscosity at 210° C., in Saybolt Universal seconds _____ 40.1
- Specific gravity at 60° F _____ .922

Sun 5512 wax—a paraffin wax:
- Melting point, °F _____ 153
- Saybolt color _____ 25
- Oil content, weight percent _____ 0.3
- Penetration at:
  - 100° F _____ 16
  - 110° F _____ 18
  - 120° F _____ 22
- Viscosity at 210° F., centistokes _____ 5.3
- Blocking temperature, °F _____ 135
- Taste and color _____ None Durawax 1227—a processed natural wax:
 Melting point, °F _____ 188–192
 Penetration _____ 1–2
 Acid value _____ 25–30
 Saponification value _____ 53–55
 Color _____ Yellow
BD-11—an emulsifiable wax:
 Specific gravity at 60° F _____ 1.005
 Melting point, °F _____ 129
 Penetration at 77° F _____ 27
 Viscosity at 210° F., in Saybolt Universal
  seconds _____ 47
 Saponification No _____ 7.7
 Acid No _____ 29.5
 $H_2O$ content, weight percent _____ 0.4

The oils which are included in the formulation are preferably but not necessarily a blend of paraffin and silicone oils, and are for the purpose of providing instantaneous gloss upon rinsing without excessive polishing and also to provide depth of gloss and water repellency. Included among suitable oils are those available in the trade under the names: L-45 silicone oil, 350 centistokes (dimethyl silicone) and paraffin oil 125/135 (American Society of Testing Materials, gravity, 31.5, grade N.F., Saybolt color +30, and Saybolt Universal seconds viscosity at 100° F., 125–135). An oil concentration of from about 3 to 11 weight percent of the total formulation has been found most advantageous.

In order to assure successful elution of the formulation of the invention from the polyurethane foam sponge upon use, an oil-in-water emulsion is necessary. To achieve this, the emulsion formulation as injected into the sponge must contain some, and preferably 43 to 54 weight percent, water. During subsequent storage most of this water evaporates, but due to the interaction of the other constituents in the formulation, no inversion of the emulsion takes place. Upon use, the evaporated water is recovered as soon as the impregnated sponge is wetted with water.

In addition to the above enumerated essential ingredients, the formulation of the invention may optionally include water glass (sodium silicate) and/or acetic acid. Water glass aids in hardening the emulsion after it is injected into the sponge. The acetic acid may be employed to adjust the pH of the emulsion to slightly acid. This insures the prevention of hydrolysis of the polyurethane foam sponge by the emulsion formulation.

Representative sample formulations of the invention which have been prepared and tested are set forth in the table below. All figures represent percentage of total composition by weight.

| Formulation No. | 1 | 2 | 3 | 4 |
| --- | --- | --- | --- | --- |
| Cationic emulsifier: | | | | |
| "Armac C" | | | | 5.0 |
| "Armac T" | 7.2 | 7.2 | 6.0 | |
| Total | 7.2 | 7.2 | 6.0 | 5.0 |
| Non-ionic emulsifier: | | | | |
| "Tergitol NP-27" | | | | 28.0 |
| "Span 40" | 0.5 | 0.5 | 0.40 | |
| "Tween 20" | 0.3 | 0.3 | 0.20 | |
| "Renex 678" | 12.0 | 12.0 | 10.0 | |
| "Aerosol OT" | 0.1 | 0.1 | 0.08 | |
| Total | 12.9 | 12.9 | 10.68 | 28.0 |
| Wax: | | | | |
| Sun 985 Y wax | | | | 4.0 |
| Sun 4415 wax | | | | 9.0 |
| BD-11 | 10.8 | 10.8 | 6.6 | |
| Sun 5512 wax | 3.6 | 3.6 | 5.4 | |
| Durawax 1227 | 1.2 | 1.2 | 1.0 | |
| Total | 15.6 | 15.6 | 13.0 | 13.0 |
| Oil: | | | | |
| Paraffin oil 125/135 | 2.4 | 2.4 | 2.0 | 10.0 |
| L-45 Silicone oil (350 centistokes) | 1.2 | 1.2 | 1.0 | 0.1 |
| Total | 3.6 | 3.6 | 3.0 | 10.1 |
| Water glass (40° Baumé) | 12.6 | 12.6 | 14.0 | |
| Acetic acid, glacial | | 2.0 | | |
| Water | 48.1 | 46.1 | 53.32 | 43.9 |
| | 100 | 100 | 100 | 100 |

The above formulations were prepared in the following manner:

Formulations 1, 2 and 3

Formulations 1 and 3 were prepared by first preparing a separate oil phase, and a water phase and finally mixing the two phases together.

The oil phase was prepared in a main mixing tank. The indicated cationic emulsifier, the indicated non-ionic emulsifiers other than "Aerosol OT," and the silicone oil were introduced into the tank and blended together at about 185° F. The "Aerosol OT" was dissolved separately in the paraffin oil at about 200° F. The "Aerosol OT" was found to be difficult to disperse if added directly to the main mixing tank. This solution was then added to the main mixing tank. As the final step in the preparation of the oil phase, the indicated waxes were melted together at about 185° F. and then added to the main mixing tank which was maintained at a temperature of about 180° F. All ingredients of the oil phase were then thoroughly blended at about 185° F.

The water phase was prepared by dissolving the water glass in tap water, and the solution was heated to a temperature of about 10–15° F. above the temperature of the oil phase.

Final mixing was carried out by adding the heated water phase to the oil phase while agitating the mixture. The mixture became very thick and chunky until most of the water phase had been added, at which time it thinned out rapidly. This final mixture was a whitish emulsion. The oil-water phase reaction is endothermic and the mixture cooled itself to about 180° F. All external heat was shut off when the hot water phase was added to the oil phase.

Formulation 2 was prepared in the exact same manner except that after final mixing of the oil phase and water phase, the indicated amount of glacial acetic acid was added to lower the pH. In the particular formulation given the pH was lowered from about 10.6 to about 6.5.

Formulation 4

The oil phase was prepared by heating the indicated waxes and oils together in the main mixing tank at about 200° F. until the waxes melted. The emulsifiers were then added and the temperature was reduced to about 175° F. The mixture was stirred until the cationic emulsifier had melted and the resulting solution was homogeneous.

Water at a temperature of about 180° F. was then added to the oil phase while it was rapidly stirred. The stirring was continued until the resulting emulsion was homogeneous and the mixture had cooled.

It will be appreciated that the above temperatures and blending techniques were merely found to be expedient in the preparation of the sample formulations which have been prepared and tested. However, any manner of blending the various essential ingredients of the formulation which results in a homogeneous emulsion is suitable.

To prepare a cleaning and waxing sponge of the invention, a measured amount of the formulation of the invention is injected with a hypodermic needle or needles into a flexible open-pore polyurethane sponge. For example, 125 grams of formulation number 4 are injected at a temperature of about 130° F. into a polyurethane block measuring 2 inches thick by 2½ inches deep by 5½ inches long. The lowest practical fill temperature for this formulation would be about 127° F. since the material will become a thick paste at about 122° F. An impregnated sponge so prepared, is capable of performing a repeated number of cleaning and waxing treatments.

In order to test the successfulness of the invention, a sponge prepared as above was employed in cleaning and waxing an automobile. The sponge was wetted with water from a hose in order to activate the impregnated formulation. A surface of the automobile was flooded with water and then rubbed gently with the sponge which was squeezed occassionally to liberate its active ingredients. The thus cleaned surface was then rinsed with clear water. During this rinse off, the water film on the automobile suddenly "broke" or parted and the water collected in beads on the finish. The automobile finish remained smooth, glossy and showed no signs of streaking. The finish of the automobile was found to be water repellent for as long as ten weeks after treatment in some instances.

Tests carried out as above have brought to light the fact, that the cleaning and waxing operation may be carried out in direct sunshine or light rain without experiencing any of the deleterious results that are experienced with prior art compositions. Also, the composition is equally suitable for application to automobile finishes previously treated with rubbing compounds, car cleaners or polishes without any sacrifice in performance. In addition, the cleaning composition has been found suitable for cleaning and waxing plastic covered upholstery. In this application, the material should be wiped off with a clean absorbent material, such as a cellulose sponge, after rinsing.

We claim:

1. A simultaneous cleaning and waxing oil-in-water emulsion which comprises from about 6 to 7 weight percent aliphatic amine acetate, from about 10 to 12 weight percent of a maximum of sorbitan monopalmitate, polyoxyethylene sorbitan monolaurate, polyoxyethylene nonylphenol and sodium dioctyl sulfosuccinate, from about 13 to 16 weight percent emulsifiable wax, from about 3 to 4 weight percent of a mixture of dimethyl silicone oil and paraffin oil, with the remainder water.

2. The emulsion of claim 1 wherein from about 12 to 14 weight percent sodium silicate is also present.

3. The emulsion of claim 2 wherein approximately 2 weight percent glacial acetic acid is also present.

4. A simultaneous cleaning and waxing oil-in-water emulsion which comprises approximately 5 weight percent of coconut oil quaternary amine acetate, approximately 28 weight percent nonyl phenyl polyethylene glycol ether, approximately 13 weight percent emulsifiable wax, approximately 10 weight percent of paraffin oil and dimethyl silicone oil mixture, with the remainder water.

5. A simultaneous cleaning and waxing oil-in-water emulsion which comprises from about 5 to 8 weight percent of a cationic emulsifier selected from the group consisting of a coconut oil quaternary amine acetate and an aliphatic amine acetate; from about 10 to 28 weight percent of a non-ionic emulsifier selected from the group consisting of sorbitan monopalmitate, polyoxyethylene sorbitan monolaurate, polyoxyethylene nonylphenol, sodium dioctyl sulfosuccinate, and nonyl phenyl polyethylene glycol ether; from about 13 to 16 weight percent of an emulsifiable wax; from about 3 to 11 weight percent of an oil selected from the group consisting of dimethyl silicone oil, paraffin oil and mixtures of the same; with the remainder water.

6. An article of manufacture suitable for simultaneously cleaning and waxing automotive finishes upon being wetted, which comprises a flexible, open-pore polyurethane sponge impregnated with a composition which upon impregnation comprises from about 5 to 8 weight percent of a cationic emulsifier selected from the group consisting of a coconut oil quaternary amine acetate and an aliphatic amine acetate; from about 10 to 28 weight percent of a non-ionic emulsifier selected from the group consisting of sorbitan monopalmitate, polyoxyethylene sorbitan monolaurate, polyoxyethylene nonylphenol, sodium dioctyl sulfosuccinate, and nonyl phenyl polyethylene glycol ether; from about 13 to 16 weight percent of an emulsifiable wax; from about 3 to 11 weight percent of an oil selected from the group consisting of dimethyl silicone oil, paraffin oil and mixtures of the same; with the remainder water.

7. The article of manufacture of claim 1 wherein the open-pore polyurethane sponge is selected from the group consisting of polyether and polyester urethanes.

8. The article of manufacture of claim 7 wherein said polyurethane sponge is characterized by a density of about 2 pounds per cubic foot, a minimum tensile strength of about 20 pounds per square inch, a minimum ultimate elongation of about 200 percent, a maximum compression set of about 10 percent, a load requirement for 50 percent compression of at least about 0.65 pound per square inch, a pore size of about 35 to 45 pores per square inch, no more than 10 percent loss in tensile strength after exposure to 5 pounds per square inch of steam for 1 hour, and an isocyanate index of from about 100 to 105.

9. The article of manufacture of claim 1 wherein the pores of one surface of said sponge are coated for a predetermined depth with a non-water soluble resin.

10. The article of manufacture of claim 9 wherein the non-water soluble resin is selected from the epoxy, alkyd, melamine, and phenolic resins.

11. An article of manufacture suitable for simultaneously cleaning and waxing automotive finishes upon being wetted, which comprises a flexible, open-pore polyurethane sponge selected from the group consisting of polyether and polyester urethanes, impregnated with a composition which upon impregnation comprises from about 6 to 7 weight percent aliphatic amine acetate; from about 10 to 12 weight percent of a mixture of sorbitan monopalmitate, polyoxyethylene sorbitan monolaurate, polyoxyethylene nonylphenol and sodium dioctyl sulfosuccinate; from about 13 to 16 weight percent emulsifiable wax; from about 3 to 4 weight percent of a mixture of dimethyl silicone oil and paraffin oil, with the remainder water.

12. The article of claim 11 wherein said composition also contains from about 12 to 14 weight percent sodium silicate.

13. The article of claim 11 wherein said composition also contains approximately 2 weight percent glacial acetic acid.

14. An article of manufacture suitable for simultaneously cleaning and waxing automotive finishes upon being wetted, which comprises a flexible, open-pore polyurethane sponge selected from the group consisting of polyether and polyester urethanes, impregnated with a composition which upon impregnation comprises approximately 5 weight percent of coconut oil quaternary amine acetate, approximately 28 weight percent nonyl phenyl polyethylene glycol ether, approximately 13 weight percent emulsifiable wax, approximately 10 weight percent of paraffin oil and dimethyl silicone oil mixture, with the remainder water.

References Cited in the file of this patent

UNITED STATES PATENTS

| 2,071,365 | Stroop | Feb. 23, 1937 |
| 2,268,403 | Kingman | Dec. 30, 1941 |
| 2,495,066 | Jones | Jan. 17, 1950 |
| 2,591,481 | Webster | Apr. 1, 1952 |
| 2,626,870 | Cooke et al. | Jan. 27, 1953 |
| 2,780,554 | Lerner | Feb. 5, 1957 |
| 3,002,937 | Parker et al. | Oct. 3, 1961 |

FOREIGN PATENTS

| 589,166 | Canada | Dec. 22, 1959 |

OTHER REFERENCES

Modern Plastics, page 126, January 1955.

UNITED STATES PATENT OFFICE
CERTIFICATE OF CORRECTION

Patent No. 3,088,158            May 7, 1963

Francis K. Boyle et al.

It is hereby certified that error appears in the above numbered patent requiring correction and that the said Letters Patent should read as corrected below.

Column 6, line 3, and line 17, for the claim reference numeral "1", each occurrence, read -- 6 --.

Signed and sealed this 31st day of December 1963.

(SEAL)
Attest:

ERNEST W. SWIDER

Attesting Officer

EDWIN L. REYNOLDS

Acting Commissioner of Patents